United States Patent
Cheng et al.

(10) Patent No.: US 11,258,778 B2
(45) Date of Patent: **\*Feb. 22, 2022**

(54) SYSTEM AND METHOD FOR BLOCKCHAIN-BASED DATA MANAGEMENT

(71) Applicant: ADVANCED NEW TECHNOLOGIES CO., LTD., Grand Cayman (KY)

(72) Inventors: Long Cheng, Hangzhou (CN); Yanpeng Li, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 180 days.

This patent is subject to a terminal disclaimer.

(21) Appl. No.: 16/472,807

(22) PCT Filed: Feb. 28, 2019

(86) PCT No.: PCT/CN2019/076473
§ 371 (c)(1),
(2) Date: Jun. 21, 2019

(87) PCT Pub. No.: WO2019/101225
PCT Pub. Date: May 31, 2019

(65) Prior Publication Data
US 2020/0120084 A1    Apr. 16, 2020

(51) Int. Cl.
*H04L 29/06*  (2006.01)
*G06F 21/31*  (2013.01)
(Continued)

(52) U.S. Cl.
CPC .......... *H04L 63/0815* (2013.01); *G06F 21/31* (2013.01); *H04L 9/0637* (2013.01);
(Continued)

(58) Field of Classification Search
CPC . H04L 63/0815; H04L 9/0637; H04L 9/3226; H04L 9/3236; H04L 9/3247; G06F 21/31
(Continued)

(56) References Cited

U.S. PATENT DOCUMENTS

| 9,990,504 B1 | 6/2018 | Chapman et al. |
| 10,114,970 B2 | 10/2018 | Goldfarb et al. |

(Continued)

FOREIGN PATENT DOCUMENTS

| CN | 106534160 A | 3/2017 |
| CN | 107819770 A | 3/2018 |

(Continued)

OTHER PUBLICATIONS

Preinterview of First Office Action for U.S. Appl. No. 16/735,499 dated Mar. 3, 2020 (10 pages).
(Continued)

*Primary Examiner* — Dant B Shaifer Harriman

(57) ABSTRACT

Methods, systems, and apparatus, including computer programs encoded on computer storage media, for performing data management. One of the methods includes: obtaining authentication information of a login user; generating a digital abstract of the authentication information of the login user; and authenticating the login user based on a comparison between the digital abstract of the authentication information of the login user and one or more digital abstracts stored on a blockchain.

20 Claims, 8 Drawing Sheets

(51) Int. Cl.
*H04L 9/06* (2006.01)
*H04L 9/32* (2006.01)

(52) U.S. Cl.
CPC .......... *H04L 9/3226* (2013.01); *H04L 9/3236* (2013.01); *H04L 9/3247* (2013.01); *H04L 2209/38* (2013.01)

(58) Field of Classification Search
USPC .......................................................... 726/6
See application file for complete search history.

(56) References Cited

U.S. PATENT DOCUMENTS

| | | |
|---|---|---|
| 10,135,835 B1 | 11/2018 | Kandel et al. |
| 10,212,145 B2 | 2/2019 | Chavez et al. |
| 10,536,445 B1 | 1/2020 | Lerner |
| 10,541,806 B2 | 1/2020 | Rosenoer |
| 2015/0304295 A1 | 10/2015 | Chiba et al. |
| 2016/0283920 A1 | 9/2016 | Fisher et al. |
| 2016/0342978 A1* | 11/2016 | Davis .................... G06Q 20/40 |
| 2017/0091756 A1 | 3/2017 | Stern et al. |
| 2017/0149560 A1 | 5/2017 | Shah et al. |
| 2017/0230444 A1* | 8/2017 | Chiang ............... H04L 67/1097 |
| 2017/0257358 A1* | 9/2017 | Ebrahimi ............... G06F 21/645 |
| 2018/0227130 A1 | 8/2018 | Ebrahimi et al. |
| 2018/0276626 A1 | 9/2018 | Laiben |
| 2018/0285879 A1 | 10/2018 | Gadnis et al. |
| 2018/0294966 A1 | 10/2018 | Hyun et al. |
| 2018/0308098 A1* | 10/2018 | Ebrahimi ......... G06K 19/06037 |
| 2018/0322491 A1* | 11/2018 | Madisetti ............. G06Q 20/389 |
| 2019/0018947 A1 | 1/2019 | Li |
| 2019/0036690 A1* | 1/2019 | Choi ........................ G09C 1/00 |
| 2019/0036696 A1 | 1/2019 | Anglin et al. |
| 2019/0097812 A1 | 3/2019 | Toth |
| 2019/0149537 A1* | 5/2019 | Ebrahimi ............ H04L 63/0861 713/171 |
| 2019/0163887 A1 | 5/2019 | Frederick et al. |
| 2019/0163896 A1 | 5/2019 | Balaraman et al. |
| 2019/0164156 A1 | 5/2019 | Lindemann |
| 2019/0166133 A1 | 5/2019 | Frederick et al. |
| 2019/0312877 A1 | 10/2019 | Zhang et al. |
| 2019/0319948 A1 | 10/2019 | Triola et al. |
| 2019/0325431 A1 | 10/2019 | Mann |
| 2019/0325436 A1 | 10/2019 | Cheng et al. |

FOREIGN PATENT DOCUMENTS

| | | |
|---|---|---|
| CN | 108694585 A | 10/2018 |
| CN | 109274652 A | 1/2019 |
| CN | 109285256 A | 1/2019 |
| JP | 2006-185184 A | 7/2006 |
| JP | 2011-145754 A | 7/2011 |
| JP | 2014-112330 A | 6/2014 |
| JP | 2015-191508 A | 11/2015 |
| WO | 2017011601 A1 | 1/2017 |
| WO | 2018069566 A1 | 4/2018 |
| WO | 2018/112946 A1 | 6/2018 |

OTHER PUBLICATIONS

Office Action for Japanese Application No. 2019-533600 dated Dec. 1, 2020.
Ezawa Yuki, et. al., "Design and Implementation of Authentication and Authorization System with Blockchain", Computer Security Symposium 2018, Information Processing Society of Japan, Oct. 15, 2018, vol. 2018, No. 2, pp. 842-849, Information Processing Society Symposium Series.
Bitbank Co., Ltd., "Impact of Blockchain", Nikkei BP, Jun. 13, 2016, First Press, pp. 219-221.
Search Report for European Application No. 19725899.9 dated Apr. 23, 2020.
Examination Report for European Application No. 19725899.9 dated May 13, 2020.
Written Opinion for Singaporean Application No. 11201905624W dated Sep. 23, 2020.
Written Opinion of the International Searching Authority and International Search Report for PCT Application No. PCT/CN2019/076473 dated Nov. 28, 2019 (8 pages).
Decision of Final Rejection for Japanese Application No. 2019-533600 dated Sep. 7, 2021.

* cited by examiner

SYSTEM AND METHOD FOR BLOCKCHAIN-BASED DATA MANAGEMENT

CROSS REFERENCE TO RELATED APPLICATION

This application is a national phase application of International Application No. PCT/CN2019/076473, filed on Feb. 28, 2019, the contents of which are incorporated by reference in its entirety.

TECHNICAL FIELD

This application generally relates to methods and devices for blockchain-based data management.

BACKGROUND

For many internet-based applications, users often need to register their information in order to access certain functions. For example, users may be required to create a user account and a password for the user account, to provide contact information and payment method, etc. Some of the registration information such as the user account and password may be used to authenticate the user identity when the user tries to access the account. Due to the free access to Internet, incidents of private data breach frequently occur. For at least some of the incidents, the breaches originated from online service providers, which collect and store user registration information.

In current technologies, online service providers or other holders of private data may lack adequate protection mechanism to safeguard such private data, which has led to frequent data breaches. Data storage at multiple locations may further increase the chance of data breaches. For example, hackers may hack into one or more of such data storage places maintained by the online service providers and export user data for malicious uses. Further, in current solutions, the online service providers often implement their own storage and access rules and maintain sole control. Data accesses are difficult to track and leave behind little evidence for security analysis or for users to claim their rights. Thus, enhanced data security for privacy protection is a challenging issue remaining to be solved.

In addition, each user may have to register accounts for different online applications, despite that similar personal information is provided. The process is repetitive, tedious, and account and password combinations may be easily mixed up. Such disadvantage to users turns out to be an advantage for hackers. Hackers may generate a library of dummy account and password combinations based on certain stolen account and password combinations for a certain online application, and use the dummy combinations to log into other online applications by trial-and-error. Since users often use common account and password combinations for different online applications, a chain of data breaches may spread across different online applications. It is therefore desirable to have a system that can securely store private data.

SUMMARY

Various embodiments of the specification include, but are not limited to, systems, methods, and non-transitory computer readable media for blockchain-based data management.

According to one embodiment, a computer-implemented method for data management comprises: obtaining authentication information of a login user; generating a digital abstract of the authentication information of the login user; and authenticating the login user based on a comparison between the digital abstract of the authentication information of the login user and one or more digital abstracts stored on a blockchain.

In some embodiments, the authentication information comprises at least one of: an account identification associated with the login user or a password associated with the account identification.

In other embodiments, the digital abstract of the authentication information comprises a hash value of the authentication information.

In still other embodiments, before obtaining the authentication information of the login user, the method further comprises: obtaining authentication information of a user for registration; generating a digital abstract based on the authentication information of the user for registration; and transmitting the digital abstract generated based on the authentication information of the user for registration to one or more nodes of the blockchain for storage in the blockchain, wherein the transmitted digital abstract is one of the one or more digital abstracts stored on the blockchain.

In yet other embodiments, obtaining the authentication information of the user for registration comprises: receiving a registration request forwarded from a service system, wherein the registration request is requested by the user for registration; providing a redirect address to the service system for the service system to render a registration page corresponding to the redirect address; and collecting the authentication information through the registration page from the user for registration.

In some embodiments, obtaining the authentication information of the user for registration further comprises: obtaining a permission from the user for registration to use the authentication information to authenticate the user for registration for one or more other service systems.

In other embodiments, obtaining authentication information of the user for registration comprises: obtaining authentication information and user detail information of the user for registration; and storing the user detail information in a storage system.

In still other embodiments, the method further comprises: obtaining a request to perform a transaction from the login user; retrieving from the storage system user detail information of the login user for performing the transaction; and executing the transaction based at least on the user detail information of the login user.

In yet other embodiments, after obtaining the request to perform the transaction and before retrieving from the storage system the user detail information for performing the transaction, the method further comprises: obtaining authentication of the login user based on another comparison between the digital abstract of the authentication information of the login user and the one or more digital abstracts stored on the blockchain.

In some embodiments, authenticating the login user based on the comparison between the digital abstract of the authentication information of the login user and one or more digital abstracts stored on a blockchain comprises: comparing the digital abstract of the authentication information of the login user with the one or more digital abstracts stored on the blockchain; and authenticating the login user in response to the digital abstract of the authentication information being the same as one of the digital abstracts stored on the blockchain.

In other embodiments, authenticating the login user based on the comparison between the digital abstract of the authentication information of the login user and one or more digital abstracts stored on a blockchain comprises: obtaining a result of the comparison from the one or more nodes of the blockchain, the comparison performed by the one or more nodes of the blockchain; and authenticating the login user in response to the digital abstract of the authentication information being the same as one of the digital abstracts stored on the blockchain according to the obtained result.

In still other embodiments, each of the one or more digital abstracts stored on the blockchain has a transaction identification associated with storing the corresponding digital abstract to the blockchain; and the method further comprises: in response to successfully authenticating the login user, obtaining a transaction identification associated with storing one of digital abstracts stored on the blockchain that matches the digital abstract of the authentication information.

In some embodiments, a data management system comprises: one or more processors; and one or more computer-readable memories coupled to the one or more processors and having instructions stored thereon that are executable by the one or more processors to perform the method of any of the preceding embodiments.

In other embodiments, a data management apparatus comprises a plurality of modules for performing the method of any of the preceding embodiments.

According to another embodiment, a data management system comprises one or more processors and one or more non-transitory computer-readable memories coupled to the one or more processors and configured with instructions executable by the one or more processors to cause the system to perform operations comprising: obtaining authentication information of a login user; generating a digital abstract of the authentication information of the login user; and authenticating the login user based on a comparison between the digital abstract of the authentication information of the login user and one or more digital abstracts stored on a blockchain.

According to yet another embodiment, a non-transitory computer-readable storage medium is configured with instructions executable by one or more processors to cause the one or more processors to perform operations comprising: obtaining authentication information of a login user; generating a digital abstract of the authentication information of the login user; and authenticating the login user based on a comparison between the digital abstract of the authentication information of the login user and one or more digital abstracts stored on a blockchain.

According to still another embodiment, a data management apparatus may comprise an obtaining module for obtaining authentication information of a login user; a generating module for generating a digital abstract of the authentication information of the login user; and an authenticating module for authenticating the login user based on a comparison between the digital abstract of the authentication information of the login user and one or more digital abstracts stored on a blockchain.

Embodiments disclosed in the specification have one or more technical effects. In some embodiments, the methods and systems can securely store authentication information. Storage in the blockchain allows for accurate record keeping of the original data. In other embodiments, when an entity registers its information, the registration information (e.g., account and password) can be stored to the blockchain in a blockchain transaction. Thus, the registration information becomes immutable and retrievable for authenticating users. In still other embodiments, the methods and systems can allow cross-use of the authentication information. In yet other embodiments, by performing one registration at one service and allowing cross-use of the authentication information, the user can use the same authentication information to access other services. This obviates the need for repeating the registration at multiple services and lowers the chance for forgetting authentication information. In yet other embodiments, the methods and systems can centralize storage of user detail information (e.g., contact, address, bank account) related to the login user in a storage cluster or the like. When the login user is authenticated, the corresponding user detail information can be retrieved for further verifying more complex operations such as initiating transactions. In some embodiments, the online service providers do not need to locally store the user data, which lowers the cost for system maintenance and enhances data security. In other embodiments, the user detail information or a representation thereof can also be stored in the blockchain to prevent tampering. Overall, user data is more securely stored and chances of data breach is lowered.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1A:
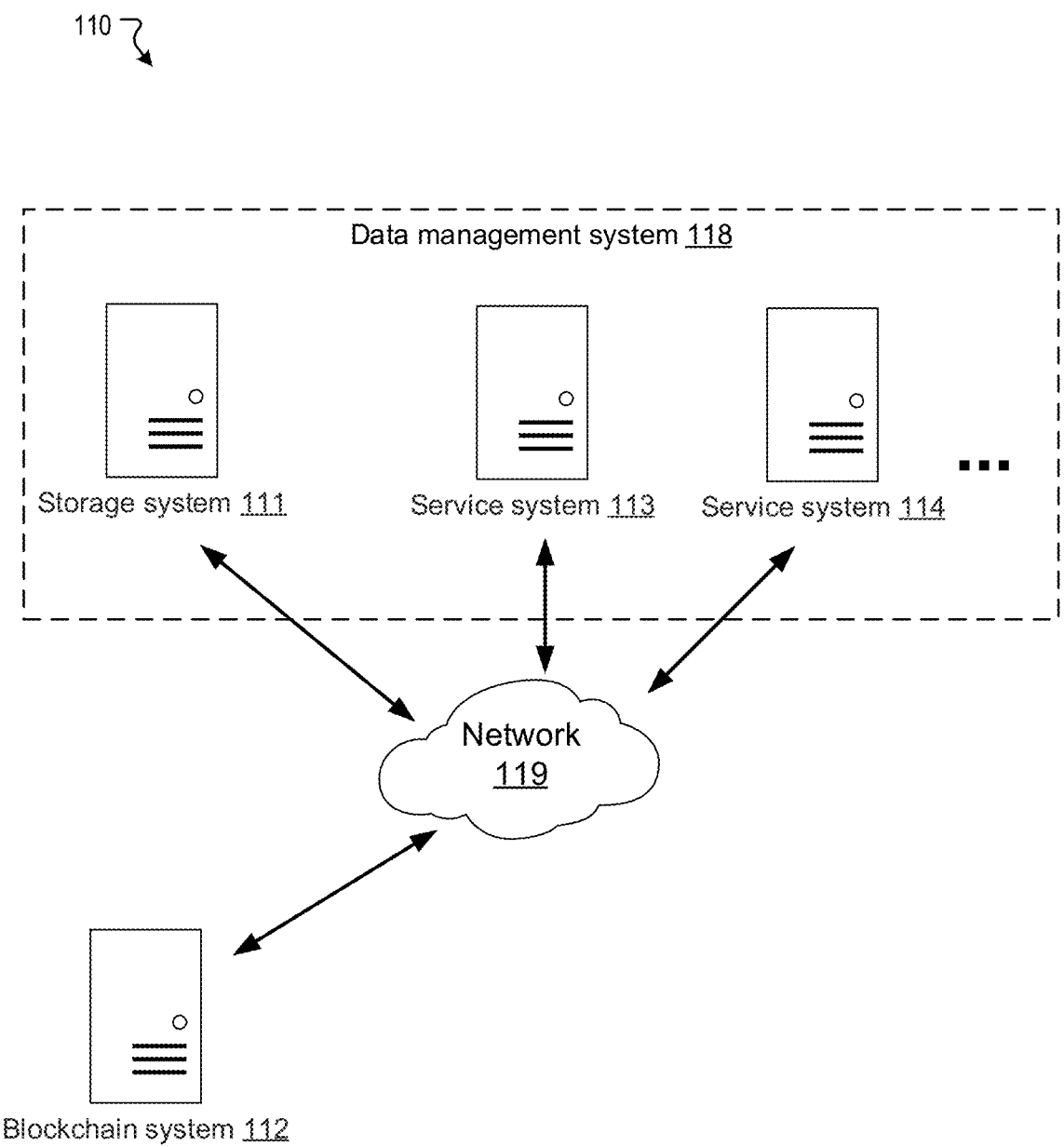
FIG. 1A illustrates an example of a blockchain-based data management system, in accordance with various embodiments.

Embodiments disclosed herein include, but are not limited to, blockchain-based data management systems, methods, and non-transitory computer readable media. In various embodiments, certain user data may be stored or shared via blockchain. For example, a data management may manage the collection of user data for various online applications. In some embodiments, user data may be registered with a data management center (referred to as a storage system), which stores user detail information and uploads abstracts of the authentication information to the blockchain. By this one-time registration, a user may attain access to multiple online service providers that have linked to the data management center, without having to repeat the registration at each of the providers. In other embodiments, the online service providers do not need to maintain individual databases storing user data. In other embodiments, different online service providers can authenticate users by accessing the blockchain and retrieve user detail information from the data management center to execute transactions or perform other operations requested by users. By storing the user data in a centralized location, the chance for data breach is lowered since the users no longer need to submit private data for multiple times or to multiple locations. In still other embodiments, a user may register once and be authenticated at different online service providers that cross-use the authentication information through access to the blockchain.

In various embodiments, the disclosed data management systems, methods, and non-transitory computer readable media may be based on various types of blockchains depending on who is allowed to participate in the network, execute the consensus protocol, and maintain the shared blockchain ledger. The various types of blockchain may include, for example, public blockchain, consortium blockchain, private blockchain, etc. The description hereinafter refers to consortium blockchain. Notwithstanding, the disclosed data management systems, methods, and non-transitory computer readable media may be applied with respect to other types of blockchain as well.

A blockchain may be considered a decentralized or partially centralized database, commonly referred to as a distributed ledger because the operation is performed by various nodes (e.g., computing devices) in a network. Any information may be written to the blockchain and saved or read from ft. Nodes are, for example, computing devices or large computer systems that support the blockchain network and keep it running smoothly. Each node may provide a part or all of the functions of the blockchain. For example, a node that provides consensus verification may be referred to as a consensus-participating node (or consensus node). Consensus may be an algorithm of rules for a network of blockchain nodes to achieve commonly-accepted processing results. Through consensus, data is continuously added into a chain of blocks. If changes are made to the block, its link to the preceding block in the chain becomes invalid, and it becomes visible to all network participants who, through the consensus rules, may prevent any further unauthorized actions.

Consortium blockchain refers to blockchain with consensus procedures controlled by preset nodes. The blockchain may allow everyone or only approved participants to access or adopt a hybrid access method. For example, the root hash and its API (Application Program Interface) may be open to the public; external parties are allowed to use API to make a certain number of inquiries and obtain information relating to blockchain status.

Consortium blockchains can best be understood when compared to their more popular counterpart, public blockchains. A public blockchain possesses no access restriction, meaning that absolutely anyone with an internet connection can become a participant of a public blockchain. More specifically, anyone in the world is able to read data that is included on the blockchain, and anyone in the world is allowed to execute blockchain transactions on a public blockchain. Also, there is no restriction as to who can participate in the consensus process for blockchains, which is the process that determines the individual or entity that can add a block to the blockchain. Public blockchains are considered to be fully decentralized, with control over the blockchain not being in the hands of any single individual or entity.

Consortium blockchains differ to their public counterparts in that they are permissioned, thus, not just anyone with an internet connection could gain access to a consortium blockchain. These types of blockchains could also be described as being semi-decentralized. Control over a consortium blockchain is not granted to a single entity, but rather a group of approved individuals. With a consortium blockchain, the consensus process is likely to differ to that of a public blockchain. Instead of anyone being able to partake in the procedure, consensus participants of a consortium blockchain are likely to be a group of pre-approved nodes on the network. The nodes may correspond to various countries, enterprises, or other entities. Thus, consortium blockchains possess the security features that are inherent in public blockchains, whilst also allowing for a greater degree of control over the network.

FIG. 1A shows an example of a system 110 for performing various disclosed steps and methods, in accordance with various embodiments. As shown, the system 110 may comprise a storage system 111, a blockchain system 112, and one or more service systems (e.g., service system 113, service system 114, etc.), each of which may correspond to one or more physical hardware devices or virtual devices coupled together via various types of communications represented by a network 119. The service systems are not limited to providing services, as the word "service" is merely for differentiating the names of various systems. Though only service system 113 and service system 114 are shown, many other service systems may be similarly included in the system 110.

Each of the storage system 111, the blockchain system 112, the service system 113, and the service system 114 may be implemented in one or more computing devices such as servers, computers, mobile phones, etc. For example, each of the systems may be implemented in a cluster of servers. The cluster of servers may employ load balancing.

Although the storage system 111, the blockchain system 112, the service system 113, and the service system 114 are shown as single components in this figure, it should be appreciated that these systems can be implemented as single devices or multiple devices coupled together. That is, two or more of the systems in FIG. 1A may be integrated into a single system or implemented as separate systems. For example, the storage system 111 and the service system 113 may be integrated into a data management system 118 comprising one or more computing devices. The data management system 118 may be referred to as a blockchain-based data management system. If integrated, the storage system 111 and the service system 113 may be implemented as various modules or similar components of the integrated system.

In various embodiments, the storage system 111 may be implemented as a cluster of centralized storage devices (e.g., servers), accessible to the various service systems. The storage system 111 may collect and store user data other than authentication information. For example, the user detail information may be stored in a databased maintained by the storage system 111. The blockchain system 112A may collect and store a representation of certain user data such as the authentication data for each user. For example, a digital abstract of the authentication data may be stored in a local blockchain copy of each node that maintains the blockchain. Thus, the various service systems do not need to store the user data.

Each of the storage system 111, the blockchain system 112, the service system 113, and the service system 114 may be installed with appropriate software (e.g., data management application program interface) and/or hardware (e.g., wires, wireless connections) to access other devices of the system 110. Each of the storage system 111, the blockchain system 112, the service system 113, and the service system 114 may include one or more processors and one or more memories coupled to the one or more processors. The memories may be non-transitory and computer-readable and be configured with instructions executable by one or more processors to cause the one or more processors to perform operations described herein.

In general, the storage system 111, the blockchain system 112, the service system 113, and the service system 114 may be able to communicate with one another through the network 119. For example, the storage system 111, the blockchain system 112, the service system 113, and the service system 114 may be able to communicate with one another through one or more wired or wireless networks (e.g., the Internet) through which data can be communicated. Various aspects of the system components are described in further details below in reference to FIG. 1B to FIG. 7.

Figure 1B:
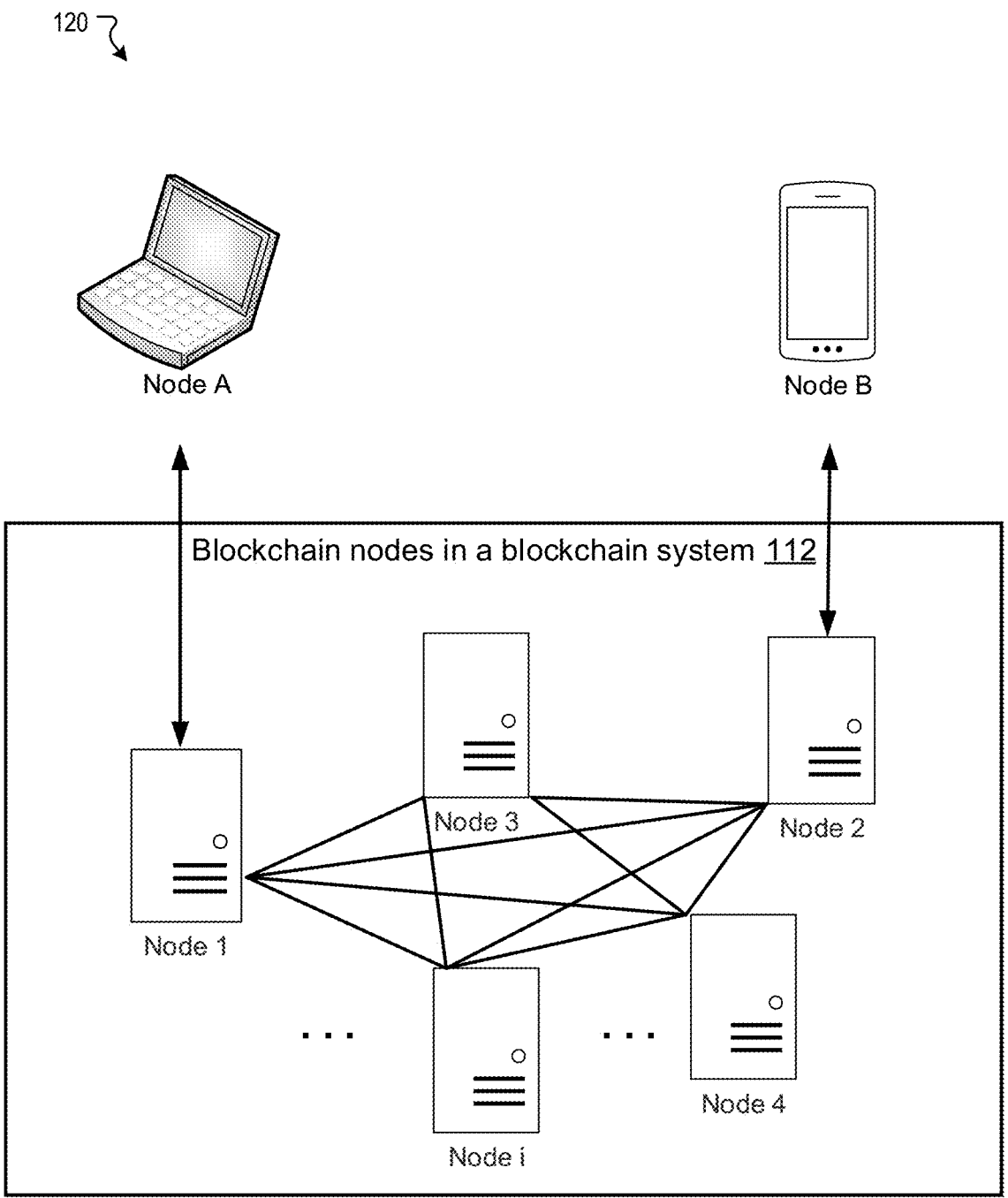
FIG. 1B illustrates an example of a blockchain network, in accordance with various embodiments.

FIG. 1B shows an example of a blockchain network 120, in accordance with various embodiments. As shown, the blockchain network 120 may comprise the blockchain system 112 described above. The blockchain system 112 may comprise a plurality of blockchain nodes (e.g., node 1, node 2, node 3, node 4, node i, etc.). The blockchain nodes may form a network (e.g., peer-to-peer network) with one blockchain node communicating with another. The order and the number of the blockchain nodes as shown are merely examples and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, one or more nodes of the blockchain system 112 may interact with other systems and devices such as the storage system 111, the service system 113, and the service system 114 described above. The interactions may involve transmission and/or reception of data for the purpose of, for instance, transactions, certificating, contracting, etc. In one example, node A (e.g., mobile phone, computer, etc.) may correspond to a device of the data management system 118 and may transmit information to node 1 (or a plurality of nodes of the blockchain system 112) for storage in the blockchain. For example, node A may be a server of the storage system 111 implemented as a server cluster. The storage process may be accomplished through a blockchain transaction. For instance, the information may be written into a blockchain contract (e.g., smart contract), and the blockchain transaction may be initiated by the node 1 (or one or more other nodes which have such privilege based on the blockchain consensus rules) to deploy the contract to the blockchain. Similar to other blockchain transactions, the blockchain transaction here may correspond to a transaction hash. The hash stands for hash value and may be a numeric output of subjecting data (e.g., identity information, transaction information associated with an executed transaction) to a hash function or algorithm. The blockchain may store the hash value of the blockchain transaction.

Later, when the information needs to be retrieved (e.g., for verification), node A/node B (e.g., mobile phone, computer, etc.) may instruct node1/node 2 (or a plurality of nodes of the blockchain system 112) to initiate another blockchain transaction to obtain the information from the blockchain. The another blockchain transaction may query the address to obtain the information according to the transaction hash. Alternatively, node A/node B may transmit certain information to node 1/node 2 to instruct one or more blockchain nodes to initiate the another transaction to verify the certain information against blockchain-stored information. Node B may belong to the data management system 118, one of the service systems, or another system (not shown) coupled to the blockchain system 112. For example, node B may be a computer of service system 113 or 114.

In the interaction with the blockchain system 112, node A and node B may be installed with an appropriate blockchain software to initiate, forward, or access the blockchain transaction. Node A may access the blockchain through communication with node 1 or one or more other nodes of the blockchain, and node B may access the blockchain through communication with node 2 or one or more other nodes of the blockchain. Node A may submit the transaction to the blockchain through node 1 or similar nodes to request adding the transaction to the blockchain.

The blockchain may be maintained by a plurality of blockchain nodes each comprising or coupling to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices similar to node A.

In some embodiments, after receiving a transaction request of an unconfirmed transaction, the recipient blockchain node may perform some preliminary verification of the transaction. For example, referring to FIG. 1B, node 1 may perform the preliminary verification after receiving a transaction from node A. Once verified, the transaction may be stored in the pool database of the recipient blockchain node (e.g., node 1), which may also forward the transaction to one or more other blockchain nodes (e.g., node 3, node 4). The one or more other blockchain nodes may repeat the process done by the recipient node. Once the transactions in the corresponding pool database reach a certain level (e.g., a threshold amount), the blockchain nodes may each verify the batch of transactions in the corresponding pool database according to consensus rules or other rules. If the blockchain transaction involves a blockchain contract (e.g., smart contract), the blockchain node may execute the blockchain contract locally.

A blockchain contract is a computer protocol intended to digitally facilitate, verify, or enforce the negotiation or performance of a contract. Blockchain contracts allow the performance of credible blockchain transactions without third parties. An example of a blockchain transaction may encode data in contract code for data storage (by contract deployment) and retrieval (by accessing or executing contract). The blockchain contract may include user-written contract code, such as the authentication information, the hash value of the authentication information, etc. A certain blockchain node that successfully verifies its batch of blockchain transactions in accordance with consensus rules may pack the blockchain transactions to add to its local copy of the blockchain and spread the results to other blockchain nodes. The certain blockchain node may be a blockchain node that has first successfully completed the verification, that has obtained the verification privilege, or that has been determined based on another consensus rule, etc. Then, the other blockchain nodes may execute the blockchain transactions locally, verify the execution results with one another (e.g., by performing hash calculation), and synchronize their copies of the blockchain with that of the certain blockchain node. By updating their local copies of the blockchain, the other blockchain nodes may similarly write such information in the blockchain transaction into respective local memories. Thus, the blockchain contract is deployed. A deployed contract can be later accessed through its corresponding address on blockchain for execution. For example, the data stored in the contract can be retrieved. If the verification fails at some point, the blockchain transaction is rejected. Notwithstanding the above, other types of blockchain systems and associated consensus rules may be applied to the disclosed blockchain system.

Figure 2:
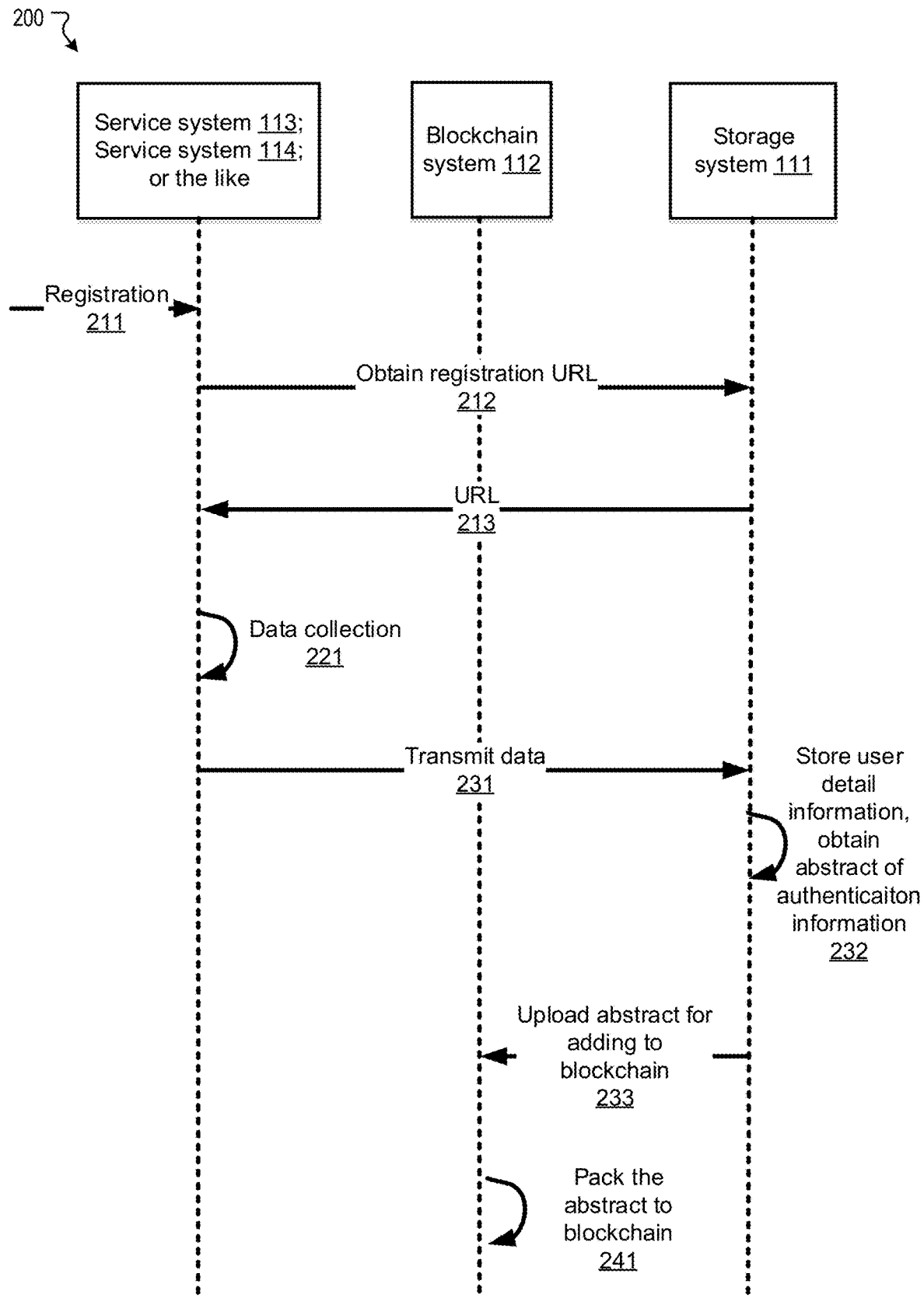
FIG. 2 illustrates an example of a method for collecting and storing user data, in accordance with various embodiments.

FIG. 2 illustrates an example of a method 200 for collecting and storing user data, in accordance with various embodiments. The method 200 may be implemented by one or more components of the system 110 of FIG. 1A (e.g., the storage system 111, the blockchain system 112, and one or more of service system 113, the service system 114, and the like). As described earlier, the storage system 111 and the service system 113, the service system 114, and the like may be integrated into the data management system 118 comprising one or more computing devices. The operations presented below are intended to be illustrative. Depending on the implementation, the method 200 may include additional, fewer, or alternative steps performed in various orders or in parallel.

In some embodiments, at step 211, a first entity may initiate information registration or another operation through one or more of the service systems (e.g., service system 113, service system 114, etc.). Hereinafter, service system 113 will be used as an example. The first entity may be referred to as a user. The first entity may be associated with an individual, a corporation, an enterprise, an organization, etc. For example, an individual user may initiate an account registration (e.g., online bank account registration, online shopping account registration, online gaming account registration, etc.) with an online service provider of the service system. Though registration is used as an example, other types of operations may be performed and data other than registration data may be collected.

At step 212, the service system 113 may redirect the operation request of step 211 to the storage system 111 to obtain a corresponding address (e.g., URL (uniform resource locator)) directing to the storage system 111 for collecting user data. Thus, the user data can bypass the service systems and be collected by the storage system 111. For example, service system 113 (e.g., an online shopping platform) and service system 114 (e.g., an online banking platform) may have joined the data management system 118. User registration at each service system may be redirected to an address provided by the storage system 111, without having to store it at any of the service systems. Further, once registered with the storage system 111, the user registration information can be shared among all existing and future service systems that have joined the data management system 118 (in the form of a searchable digital abstract stored on blockchain) for authenticating the user. To that end, users may be prompted for authorizing cross-use of user registration among different service systems and give such authorization. Cross-use means that applying the registration at one service to other services. For example, by cross-using a person's registration at website A, the person's account authentication is shared to other websites and the person gains access to other websites without having to register at each of the other websites. Users are thus saved from the hassle of repeating the registration process at multiple sites.

At step 213, the storage system 111 may transmit the corresponding address to the service system 113.

At step 221, the service system 113 may redirect the user to the address to collect user data, such as the registration information. For example, the registration operation may require the user to provide certain private information (e.g., name, ID number, home address, contact number, payment account information, etc.) to gain access to the provided service. The service system 113 may cause rendering of information associated with the address to collect user data, such as a webpage directly linked to the storage system 111. Thus, storage system 111 may obtain the user data entered by the user.

At step 231, the service system 113 may transmit the collected user data to the storage system 111. The transmission may be performed through the redirect address, for example, a page linked to the storage system 111. In some embodiments, the collected user data may comprise: user account, password, user name, user identification, user contact, user address, payment method, etc. The user account and/or the password may serve as an identification of the user. The password may be associated with the user account. The password is not limited to traditional text password and may include various types of passwords such biometric password, fingerprint password, voice password, iris password, gesture password, etc.

At step 232, the storage system 111 may generate a digital abstract of authentication information (e.g., user account and password) and store user detail information (e.g., contact information, address, payment information, or similar user data other than the authentication information). The digital abstract and the user detail information are associated with each other. The storage system 111 may not store the authentication information for privacy and security concerns. In some embodiments, the digital abstract may comprise a cryptographic representation (e.g., a hash value obtained through SHA-256) of the authentication information and may be used for authenticating user identity (e.g., where someone attempts to log into the user account). The user detail information may be referred to as a summary and may be stored as plaintext data. The user detail information may be tailored for each corresponding service system depending on the configuration. For example, each service system may have different sets of required information for users to provide.

At step 233, the storage system 111 may transmit the digital abstract to the blockchain system 112 for adding to the blockchain. At step 241, the blockchain system 112 may pack the digital abstract into the blockchain according to its consensus protocol.

In various embodiments, the storage system 111 may include one or more lightweight nodes (e.g., node A, node B). The storage system 111 may initiate a first blockchain transaction (or first transaction for short) through a node of the blockchain system 112 (e.g., node 1) coupled to the lightweight node(s). For example, the digital abstract may be written into a blockchain contract (e.g., smart contract), and the first blockchain transaction may be initiated to deploy the contract to the blockchain. By the deployment, the contract is accessible from the blockchain for execution, retrieval, or other operations. The first blockchain transaction in this case may correspond to a first transaction identification (e.g., first transaction hash). For example, the first blockchain transaction identification can be a hash value of the first blockchain transaction. The first transaction identification may be also associated with the registering entity. The blockchain may store the digital abstract (e.g., hash value of the authentication information), but not store details (e.g., plaintext) of the authentication information to ensure security and privacy, since blockchain-stored data is visible to various blockchain nodes. The first transaction identification may be sent to the service system 113 and/or the storage system 111. The blockchain may also store the first transaction identification. Thus, the first blockchain transaction identification and the registering entity are anchored (associated). By querying the first transaction identification, the blockchain-stored digital abstract can be retrieved. For example, when the first blockchain transaction identification is sent to the blockchain system 112 (e.g., a blockchain node), the blockchain system 112 may execute the blockchain contract to retrieve the blockchain-stored digital abstract. There are many other suitable ways to store and retrieve the digital abstract stored on the blockchain. A person having ordinary skill in the art should appreciate that the embodiments of this specification are not limited to the above example.

The method 200 may be repeated for multiple users to complete registration. Thus, the blockchain may end up storing multiple digital abstracts of authentication data for multiple users to access one or more service systems.

Figure 3:
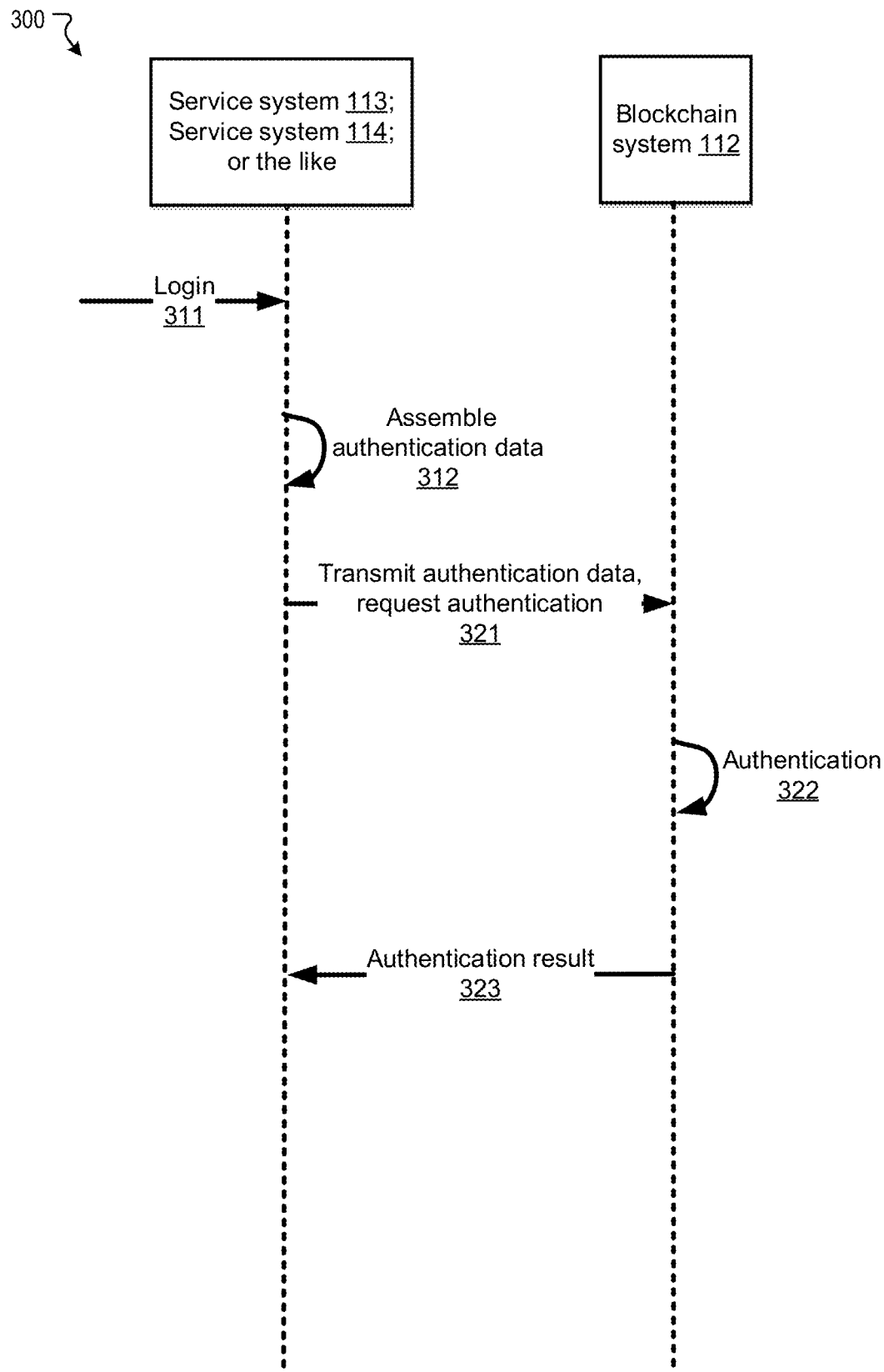
FIG. 3 illustrates an example of a method for authenticating user account, in accordance with various embodiments.

FIG. 3 illustrates an example of a method 300 for authenticating user account, in accordance with various embodiments. The method 300 may be implemented by one or more components of the system 110 of FIG. 1A (e.g., the blockchain system 112, and one or more of service system 113, the service system 114, and the like). As described earlier, the service system 113, the service system 114, and the like may be integrated into the data management system 118 comprising one or more computing devices. The operations presented below are intended to be illustrative. Depending on the implementation, the method 300 may include additional, fewer, or alternative steps performed in various orders or in parallel.

In some embodiments, at step 311, a second entity (same as or different from the first entity) may attempt to log into one of the service systems (e.g., service system 113) of the data management system 118 with the user information described above (e.g., registration data such as user account and password combination). The second entity may be referred to as a user.

At step 312, the service system may assemble authentication data. Since different service systems may require authentication of different sets of data. The authentication data may be assembled according to the particular service system. For example, the service system may obtain authentication information (e.g., user account and password) and generate a digital abstract (e.g., hash value) of the authentication information. The storage system 111 and/or the blockchain system 112 may have made public the cryptographic process (e.g., SHA-256) used to generate the digital abstract of authentication information at step 232. Thus, the service system may use the same cryptographic process to generate the digital abstract of the authentication information.

At step 321, the service system 113 may transmit the assembled authentication data (e.g., the digital abstract of the authentication information) to the blockchain system 112. The service system 113 may generate the digital abstract of the authentication information.

Alternatively, the blockchain system 112 (e.g., a node of blockchain system 112) may directly obtain authentication information of the login user and generate the digital abstract of the authentication information.

At step 322, the blockchain system 112 may verify if the login user exists (if the user has registered with the data management system 118). In doing so, the blockchain system 112 may obtain one or more blockchain-stored digital abstracts of authentication information corresponding to one or more users from the blockchain. The blockchain system 112 may determine if the digital abstract of the authentication information of the login user matches any blockchain-stored digital abstract of authentication information by comparing the corresponding digital abstracts. The digital abstracts may be hash values. Thus, the blockchain system 112 may obtain authentication of the login user based on a comparison between the digital abstract of the authentication information of the login user and the one or more digital abstracts stored in the blockchain.

At step 323, the blockchain system 112 may return an authentication result to the service system 113. If there is a match in step 322, the authentication result may be that the login user exists. The login user is thus authenticated, and the login succeeds. The existence of the login user means that the account was rightfully created and the login account is valid. Optionally, if there is the match in step 322, the authentication result may include the transaction identification associated with storing the authentication information to the blockchain. If there is no match in step 322, the authentication result may be that the login user does not exist, and the login attempt is rejected.

Alternative to steps 322 and 323, the service system 113 may retrieve the blockchain-stored digital abstract of authentication information according to the first transaction identification. Then, the service system 113 may determine if the digital abstract of the authentication information matches the blockchain-stored digital abstract of the authentication information by comparing the digital abstracts. Thus, the service system 113 may obtain authentication of the login user based at least on a comparison between the digital abstract of the authentication information of the login user and the one or more digital abstracts stored in the blockchain.

Figure 4:
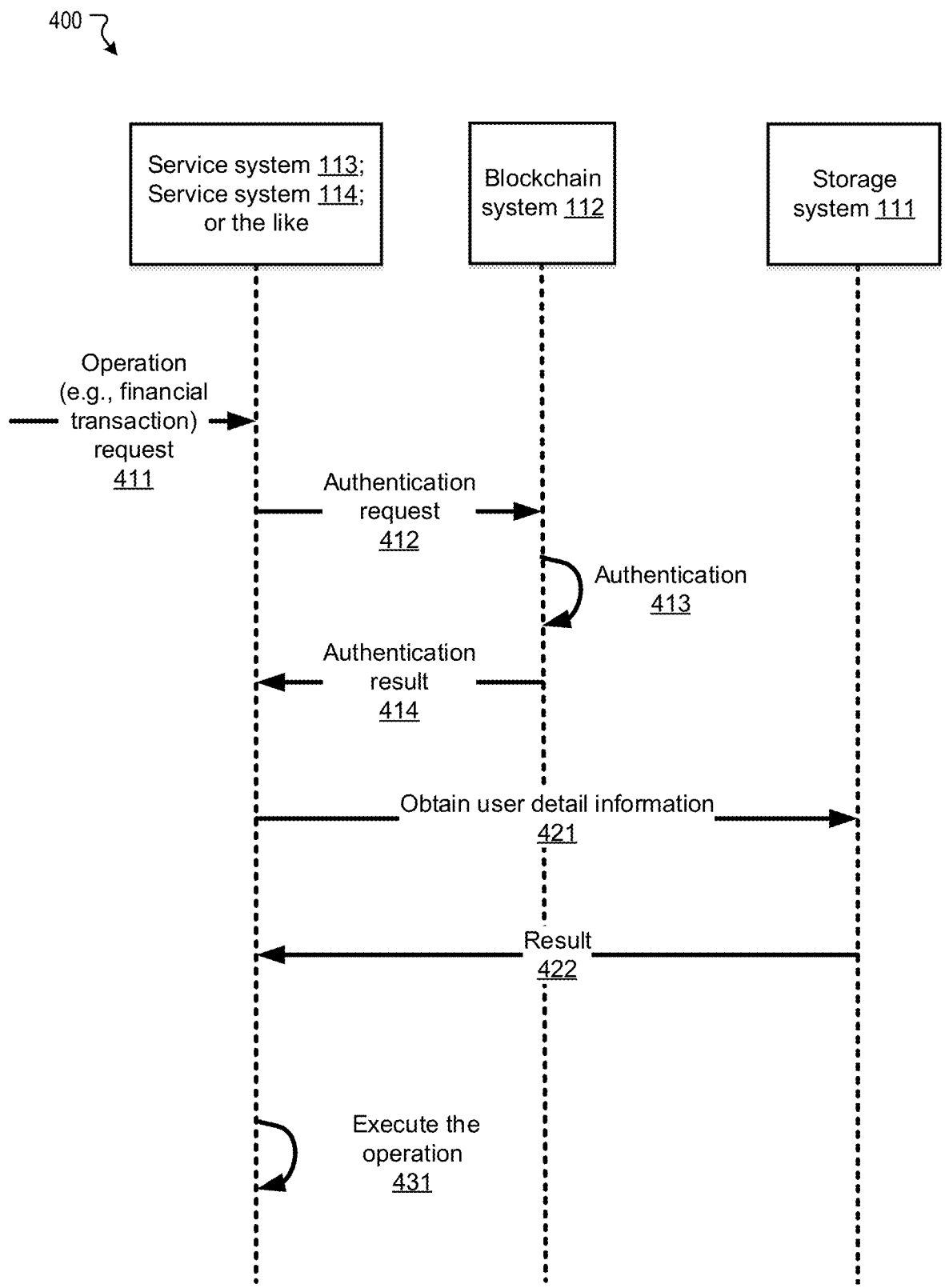
FIG. 4 illustrates an example of a method for retrieving user data, in accordance with various embodiments.

FIG. 4 illustrates an example of a method 400 for retrieving user data, in accordance with various embodiments. The method 400 may be implemented by one or more components of the system 110 of FIG. 1A (e.g., the storage system 111, the blockchain system 112, and one or more of service system 113, the service system 114, and the like). As described earlier, the storage system 111, the service system 113, the service system 114, and the like may be integrated into the data management system 118 comprising one or more computing devices. The operations presented below are intended to be illustrative. Depending on the implementation, the method 400 may include additional, fewer, or alternative steps performed in various orders or in parallel.

In some embodiments, at step 411, the second entity may initiate a financial transaction or another operation through one of the service systems (e.g., service system 113). For example, after logging into an online shopping account, the second entity (e.g., a user) may initiate a payment operation to purchase an item. To execute the payment operation, certain user detail information such as the user's name, contact number, and payment method may be need to be provided.

Steps 412, 413, and 414 are optional and may be the same as steps 321, 322, and 323 described above. Two purposes may be served by performing steps 412, 413, and 414. First, another round of authentication of user identity makes sure that the real user is conducting the transaction and not by someone else, such as a stranger who came to a public computer that the previous user completed login and forgot to log out. Thus, data security is further improved, and the risk of unauthorized use of personal funds is reduced. Second, the user is notified that user detail information will be retrieved. At step 323 and/or step 414, the authentication result returned to the service system includes the transaction identification associated with storing the authentication information to the blockchain.

At step 421, the service system 113 may obtain at least some of the user detail information from the storage system 111 according to the returned transaction identification. For example, since the storage system 111 stores entity information associated with the transaction identification and user detail information, the service system may obtain user detail information of the login user for conducting the initiated financial transaction from the storage system 111 based on the transaction identification. The obtained user detail information may include, for example, recipient name, payor name, contact number, shipping address, payment method, etc.

At step 422, the storage system 111 may return the at least some user detail information to the service system 113.

At step 431, the service system 113 may execute the financial transaction or another operation based on the at least some user detail information. For example, the service system 113 may finish the purchase transaction by using the obtained user detail information.

Figure 5:
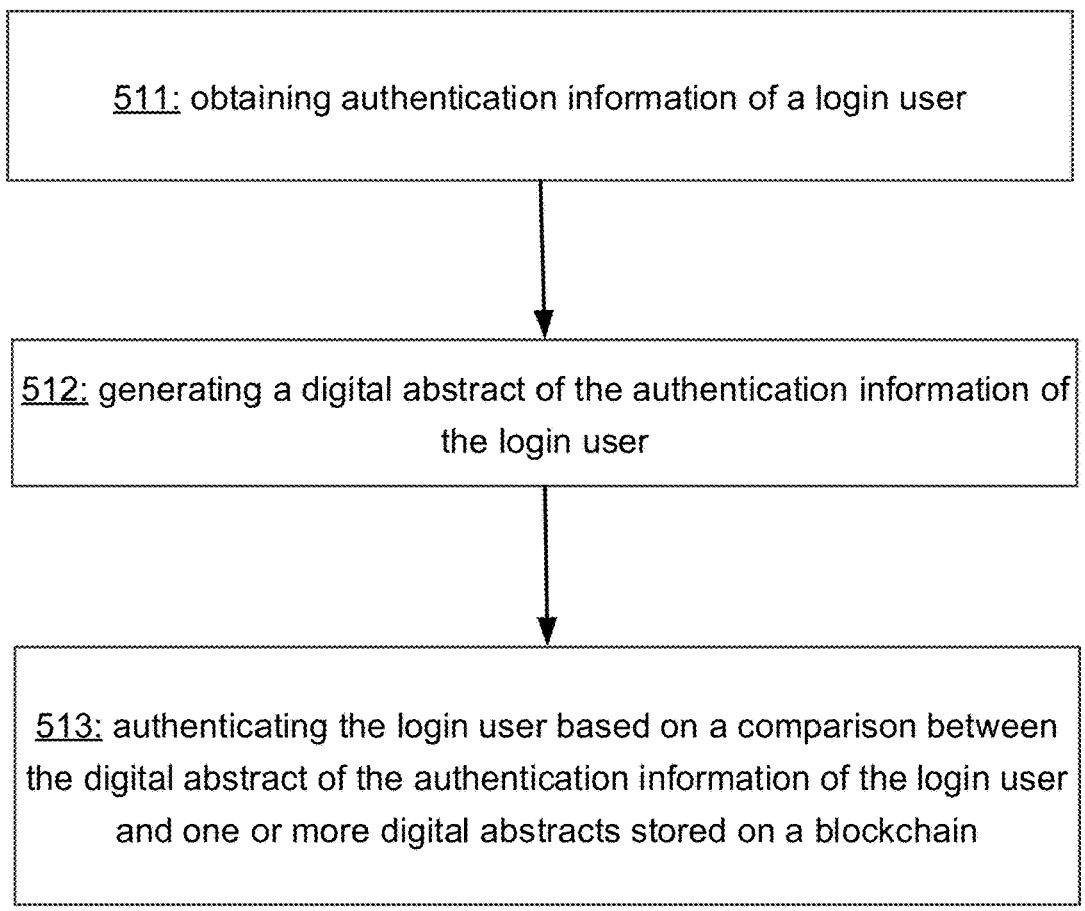
FIG. 5 illustrates a flow chart of an example of a method for blockchain-based data management, in accordance with various embodiments.

FIG. 5 illustrates a flow chart of an example of a method 510 for data management, in accordance with various embodiments. The method 510 may be implemented by one or more components (e.g., the data management system 118) of the system 110 or a node of the blockchain system 112 of FIG. 1A. The method 510 may be implemented by a system comprising various hardware machine and/or software. For example, the data management system 118 may be implemented by one or more systems or devices (e.g., computers, servers). The system implementing the method 510 may comprise one or more processors and one or more non-transitory computer-readable storage media (e.g., one or more memories) coupled to the one or more processors and configured with instructions executable by the one or more processors to cause the system (e.g., the processor) to perform the method 510. The operations presented below are intended to be illustrative. Depending on the implementation, the method 510 may include additional, fewer, or alternative steps performed in various orders or in parallel. An example of an implementation of the method 510 is described above with reference to FIG. 2 to FIG. 4.

Step 511 includes obtaining authentication information of a login user. In some embodiments, the authentication information comprises an account identification associated with the login user and/or a password associated with the account identification. For example, an account and a password entered by a user for login or the account alone may be captured. Further details can be referred to step 311 described above.

Step 512 includes generating a digital abstract of the authentication information of the login user. In some embodiments, the digital abstract of the authentication information comprises a hash value of the authentication information. In some embodiments, the digital abstract of the authentication information of the login user is generated by the same cryptographic process (e.g., SHA-256) as that for the digital abstracts stored on the blockchain. In some embodiments, the digital abstract of the authentication information comprises a hash value of the authentication information. Further details can be referred to step 312 described above.

Step 513 includes authenticating the login user based on a comparison between the digital abstract of the authentication information of the login user and one or more digital abstracts stored on a blockchain.

In some embodiments, authenticating the login user based on the comparison between the digital abstract of the authentication information of the login user and one or more digital abstracts stored on a blockchain comprises: comparing the digital abstract of the authentication information of the login user with the one or more digital abstracts stored on the blockchain; and authenticating the login user in response to the digital abstract of the authentication information being the same as one of the digital abstracts stored on the blockchain. That is, the authentication of the login user may be performed by one or more components (e.g., the data management system 118) of the system 110.

In other embodiments, authenticating the login user based on the comparison between the digital abstract of the authentication information of the login user and one or more digital abstracts stored on a blockchain comprises: obtaining a result of the comparison from the one or more nodes of the blockchain, the comparison performed by the one or more nodes of the blockchain; and authenticating the login user in response to the digital abstract of the authentication information being the same as one of the digital abstracts stored on the blockchain according to the obtained result. That is, the authentication of the login user may be performed by one or more nodes of the blockchain system 112. For example, the data management system 118 may instruct the one or more nodes of the blockchain to compare the digital abstract of the authentication information of the login user and one or more digital abstracts stored on the blockchain through a query. The query may yield a result of whether the digital abstract of the authentication information of the login user matches with any of the digital abstracts stored on the blockchain.

Whether the authentication of the login user is performed by the one or more components of the system 110 or by the one or more nodes of the blockchain system 112, a result that the login user exists in the system (the login is valid) may be obtained if the digital abstract of the authentication information matches any of the blockchain-stored digital abstracts, and a result that the login user does not exist in the system (the login is invalid) may be obtained if the digital abstract of the authentication information matches none of the blockchain-stored digital abstracts. Further details can be referred to steps 311, 312, 321, 322, and 323 described above.

In still other embodiments, each of the one or more digital abstracts stored on the blockchain has a transaction identification (e.g., transaction hash) associated with storing the corresponding digital abstract to the blockchain; and the method further comprises: in response to successfully authenticating the login user, obtaining a transaction identification associated with storing one of digital abstracts stored on the blockchain that matches the digital abstract of the authentication information. Further details can be referred to step 323 or 414 described above. Based on the transaction identification, the stored digital abstracts can be retrieved.

In some embodiments, before obtaining the authentication information of the login user at step 511, the method further comprises: obtaining authentication information of a user for registration; generating a digital abstract based on the authentication information of the user for registration; and transmitting the digital abstract generated based on the authentication information of the user for registration to one or more nodes of the blockchain for storage in the blockchain, wherein the transmitted digital abstract is one of the one or more digital abstracts stored on the blockchain. The user for registration may refer to a user registering with a service system. By these steps, various users may register their authentication information of the accounts, the digital abstracts of which may be securely stored to the blockchain and retrievable for future authentication.

In some embodiments, obtaining the authentication information of the user for registration comprises: receiving a registration request forwarded from a service system, wherein the registration request is requested by the user for registration; providing a redirect address (e.g., URL) to the service system for the service system to render a registration page corresponding to the redirect address; and collecting the authentication information through the registration page from the user for registration. Thus, the authentication information of various users attempting to register at various services systems can be collected by a centralized system (e.g., the storage system 111), improving the security for the data storage and unburdening the service systems from collecting and safe-keeping data. In one embodiment, obtaining the authentication information of the user for registration further comprises: obtaining a permission from the user for registration to use the authentication information to authenticate the user for registration for one or more other service systems. Thus, the user does not have to repeat the registration at multiple service systems. Further details can be referred to steps 211, 212, 213, 221, and 231 described above.

In other embodiments, obtaining authentication information of the user for registration comprises: obtaining authentication information and user detail information of the user for registration; and storing the user detail information in a storage system. For example, the user detail information may include contact information, address information, identification information, etc. The user detail information may be used in performing various transactions or other operations offered by the service systems. In one embodiment, the method further comprises: obtaining a request to perform a transaction from the login user; retrieving from the storage system user detail information of the login user for performing the transaction; and executing the transaction based at least on the user detail information of the login user. Further details can be referred to steps 411, 421, 422, and 431 described above. After obtaining the request to perform the transaction and before retrieving from the storage system the user detail information for performing the transaction, the method further comprises: obtaining authentication of the login user based on another comparison between the digital abstract of the authentication information of the login user and the one or more digital abstracts stored on the blockchain. Further details can be referred to steps 412, 413, and 414 described above. For example, a user may log into an account by entering authentication information at a service system such as an online shopping site. After browsing, the user may decide to purchase certain goods and thereby initiate a transaction. The service system may optionally prompt the user to re-enter the authentication information. Then, the service system may retrieve user detail information such as shipping address, contact number, and payment information for performing the transaction.

In some embodiments, transmitting the digital abstract generated based on the authentication information of the user for registration to the one or more nodes of the blockchain for storage in the blockchain comprises: writing the digital abstract generated based on the authentication information of the user for registration into a blockchain contract; and causing the one or more nodes to initiate a blockchain transaction to deploy the blockchain contract. Further details can be referred to steps 232, 233, and 241 described above.

Figure 6:
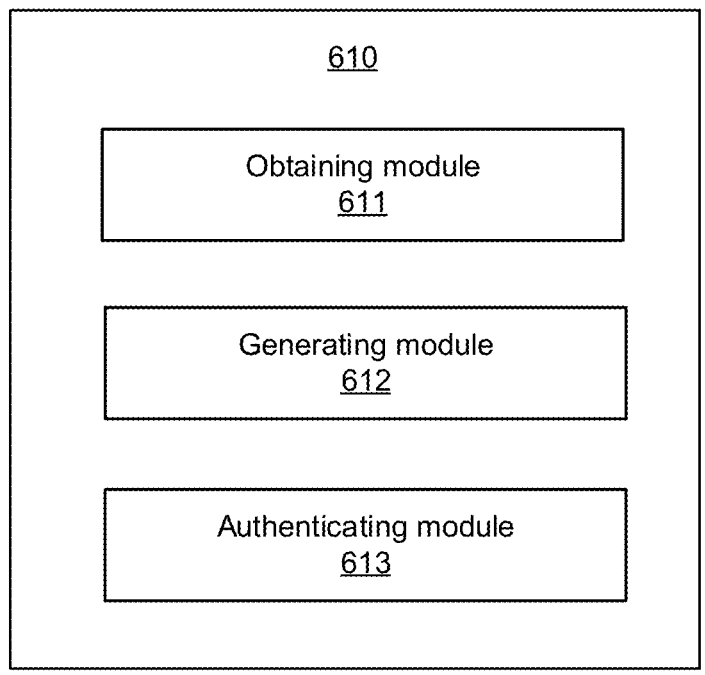
FIG. 6 illustrates a block diagram of an example of a blockchain-based data management computer system, in accordance with various embodiments.

FIG. 6 illustrates a block diagram of an example of a blockchain-based data management computer system 610, in accordance with various embodiments. The system 610 may be an example of an implementation of one or more components (e.g., data management system 118) of the system 110 or a node of the blockchain system 112 of FIG. 1A. The method 510 may be implemented by the computer system 610. The computer system 610 may comprise one or more processors and one or more non-transitory computer-readable storage media (e.g., one or more memories) coupled to the one or more processors and configured with instructions executable by the one or more processors to cause the system or device (e.g., the processor) to perform the method 510. The computer system 610 may comprise various units/modules/sub-modules corresponding to the instructions (e.g., software instructions). In some embodiments, the computer system 610 may be referred to as a data management apparatus. The data management apparatus may comprise a first obtaining module 611 for obtaining authentication information of a login user; a generating module 612 for generating a digital abstract of the authentication information of the login user; and an authenticating module 613 for authenticating the login user based on a comparison between the digital abstract of the authentication information of the login user and one or more digital abstracts stored on a blockchain.

As shown, by centralizing the user data storage for multiple service systems, user privacy can be properly protected at an improved standard. User registration data is collected through a common storage system, which stores user detail information, while a digital abstract of the authentication information is stored to the blockchain. Thus, a representation of the authentication information can be securely maintained and invokable by the service systems for authenticating users. Tampering of the authentication information can be thwarted based on the blockchain consensus rules including hashing. The digital abstract representation of the authentication information may also hide away plaintext information to prevent user information breach. Through querying the storage system, user detail information can be retrieved for executing transactions or performing other operations. Thus, users can safely access multiple service systems without undergoing repetitive registration processes and without fear for data breaches.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof. For example, the virtual machine may include an Ethereum Virtual Machine (EVM) software that provides the runtime environment for smart contracts in Ethereum.

Figure 7:
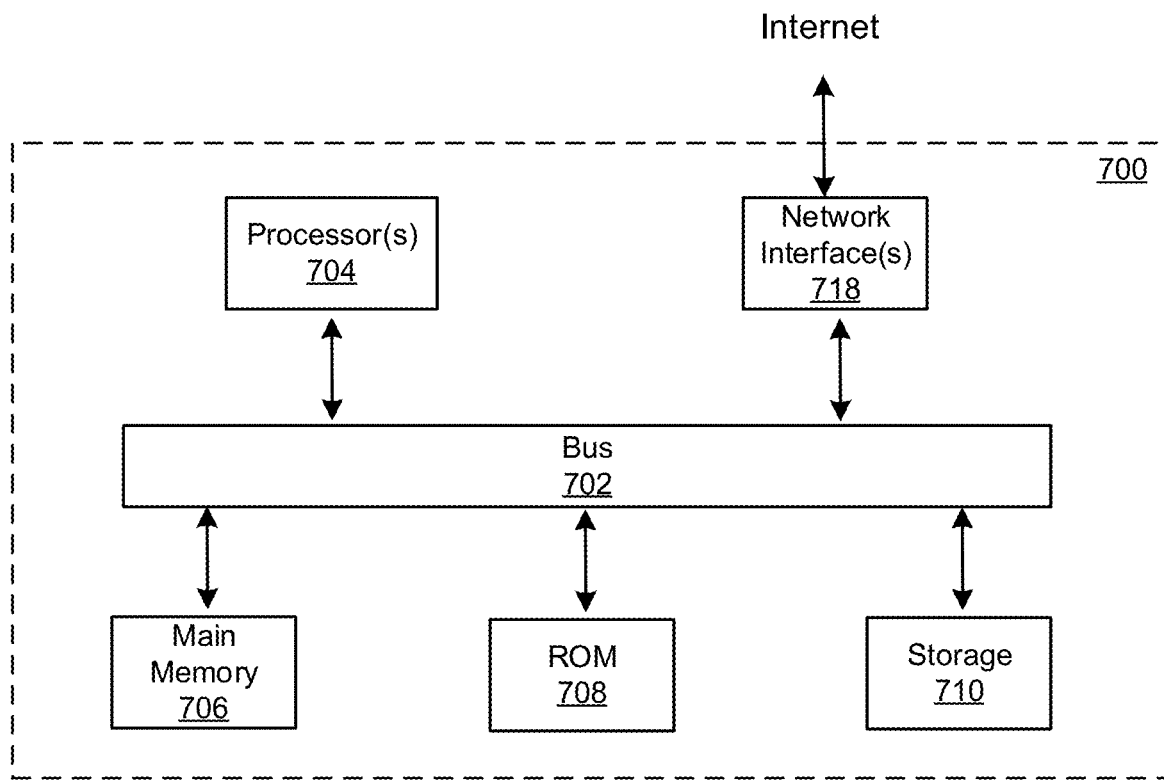
FIG. 7 illustrates a block diagram of an example of a computer system in which any of the embodiments described herein may be implemented.

FIG. 7 is a block diagram that illustrates a computer system 700 upon which any of the embodiments described herein may be implemented. The system 700 may be implemented in any of the nodes described herein and configured to perform corresponding steps for implementing blockchain contract. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method for data management, comprising:
    collecting user data comprising authentication information of a registration user and user detail information of the registration user, wherein the authentication information comprises an account identification and password combination, and the user detail information comprises a contact, an address, and/or a payment method of the registration user;
    storing a blockchain transaction comprising a digital abstract of the authentication information of the registration user to a blockchain;
    storing, in a centralized storage system separate from the blockchain, the user detail information of the registration user in association with a transaction identification of the blockchain transaction stored to the blockchain;
    obtaining authentication information of a login user;
    generating a digital abstract of the authentication information of the login user;
    obtaining a first authentication result that the login user is the registration user based on a first comparison between the digital abstract of the authentication information of the login user and one or more digital abstracts stored on the blockchain including the digital abstract of the authentication information of the registration user;
    based on the first authentication result, obtaining an operation from the login user, wherein execution of the operation requires at least a portion of the user detail information;
    based on the operation, obtaining the authentication information of the login user and obtaining a second authentication result that the login user is the registration user based on a second comparison between a digital abstract of the authentication information of the login user obtained based on the operation and one or more digital abstracts stored on the blockchain including the digital abstract of the authentication information of the registration user;
    based on the second authentication result, obtaining, from the centralized storage system separate from the blockchain, at least the portion of the user detail information according to the transaction identification; and
    executing the operation off the blockchain based at least on the portion of the obtained user detail information.

2. The method of claim 1, wherein:
    the operation is an online purchase.

3. The method of claim 1, wherein:
    the digital abstract of the authentication information comprises a hash value of the authentication information.

4. The method of claim 1, wherein the user detail information excludes account and password information.

5. The method of claim 1, wherein collecting the user data comprises:
    receiving a registration request of the registration user;
    providing a redirect address to render a registration page corresponding to the redirect address; and collecting the authentication information of the registration user through the registration page.

6. The method of claim 1, wherein collecting the user data comprises:
obtaining a permission from the registration user to use the authentication information of the registration user for user authentication across a plurality of service systems.

7. The method of claim 1, wherein obtaining the first authentication result comprises:
comparing the digital abstract of the authentication information of the login user with the one or more digital abstracts stored on the blockchain; and
determining that the login user is the registration user in response to the digital abstract of the authentication information of the login user matching the digital abstract of the authentication information of the registration user.

8. The method of claim 1, wherein obtaining the second authentication result comprises:
comparing the digital abstract of the authentication information of the login user with the one or more digital abstracts stored on the blockchain; and
determining that the login user is the registration user in response to the digital abstract of the authentication information matching the digital abstract of the authentication information of the registration user.

9. The method of claim 1, wherein obtaining the first authentication result comprises:
obtaining the first authentication result from one or more nodes of a blockchain system of the blockchain, the first authentication result comprising the transaction identification; and
wherein the first authentication result is based on the blockchain system finding the digital abstract of the authentication information matching the digital abstract of the authentication information of the registration user.

10. The method of claim 1, wherein obtaining the second authentication result comprises:
obtaining the first authentication result from one or more nodes of a blockchain system of the blockchain, the first authentication result comprising the transaction identification; and
wherein the first authentication result is based on the blockchain system finding the digital abstract of the authentication information matching the digital abstract of the authentication information of the registration user.

11. A data management system, comprising one or more processors and one or more non-transitory computer-readable memories coupled to the one or more processors and configured with instructions executable by the one or more processors to cause the system to perform operations comprising:
collecting user data comprising authentication information of a registration user and user detail information of the registration user, wherein the authentication information comprises an account identification and password combination, and the user detail information comprises a contact, an address, and/or a payment method of the registration user;
storing a blockchain transaction comprising a digital abstract of the authentication information of the registration user to a blockchain;
storing, in a centralized storage system separate from the blockchain, the user detail information of the registration user in association with a transaction identification of the blockchain transaction stored to the blockchain;
obtaining authentication information of a login user;
generating a digital abstract of the authentication information of the login user;
obtaining a first authentication result that the login user is the registration user based on a first comparison between the digital abstract of the authentication information of the login user and one or more digital abstracts stored on the blockchain including the digital abstract of the authentication information of the registration user;
based on the first authentication result, obtaining an operation from the login user, wherein execution of the operation requires at least a portion of the user detail information;
based on the operation, obtaining the authentication information of the login user and obtaining a second authentication result that the login user is the registration user based on a second comparison between a digital abstract of the authentication information of the login user obtained based on the operation and one or more digital abstracts stored on the blockchain including the digital abstract of the authentication information of the registration user;
based on the second authentication result, obtaining, from the centralized storage system separate from the blockchain, at least the portion of the user detail information according to the transaction identification; and
executing the operation off the blockchain based at least on the portion of the obtained user detail information.

12. The system of claim 11, wherein:
the operation is an online purchase.

13. The system of claim 11, wherein:
the digital abstract of the authentication information comprises a hash value of the authentication information.

14. The system of claim 11, wherein the user detail information excludes account and password information.

15. A non-transitory computer-readable storage medium configured with instructions executable by one or more processors to cause the one or more processors to perform operations comprising:
collecting user data comprising authentication information of a registration user and user detail information of the registration user, wherein the authentication information comprises an account identification and password combination, and the user detail information comprises a contact, an address, and/or a payment method of the registration user;
storing a blockchain transaction comprising a digital abstract of the authentication information of the registration user to a blockchain;
storing, in a centralized storage system separate from the blockchain, the user detail information of the registration user in association with a transaction identification of the blockchain transaction stored to the blockchain;
obtaining authentication information of a login user;
generating a digital abstract of the authentication information of the login user;
obtaining a first authentication result that the login user is the registration user based on a first comparison between the digital abstract of the authentication information of the login user and one or more digital abstracts stored on the blockchain including the digital abstract of the authentication information of the registration user;

based on the first authentication result, obtaining an operation from the login user, wherein execution of the operation requires at least a portion of the user detail information;

based on the operation, obtaining the authentication information of the login user and obtaining a second authentication result that the login user is the registration user based on a second comparison between a digital abstract of the authentication information of the login user obtained based on the operation and one or more digital abstracts stored on the blockchain including the digital abstract of the authentication information of the registration user;

based on the second authentication result, obtaining, from the centralized storage system separate from the blockchain, at least the portion of the user detail information according to the transaction identification; and executing the operation off the blockchain based at least on the portion of the obtained user detail information.

16. The storage medium of claim 15, wherein:
the user detail information excludes account and password information.

17. The storage medium of claim 15, wherein collecting the user data comprises:
obtaining a permission from the registration user to use the authentication information of the registration user for user authentication across a plurality of service systems.

18. The storage medium of claim 15, wherein obtaining the first authentication result comprises:
comparing the digital abstract of the authentication information of the login user with the one or more digital abstracts stored on the blockchain; and
determining that the login user is the registration user in response to the digital abstract of the authentication information of the login user matching the digital abstract of the authentication information of the registration user.

19. The storage medium of claim 15, wherein obtaining the second authentication result comprises:
comparing the digital abstract of the authentication information of the login user with the one or more digital abstracts stored on the blockchain; and
determining that the login user is the registration user in response to the digital abstract of the authentication information matching the digital abstract of the authentication information of the registration user.

20. The storage medium of claim 15, wherein obtaining the first authentication result comprises:
obtaining the first authentication result from one or more nodes of a blockchain system of the blockchain, the first authentication result comprising the transaction identification; and
wherein the first authentication result is based on the blockchain system finding the digital abstract of the authentication information matching the digital abstract of the authentication information of the registration user.

* * * * *